(12) United States Patent
Takada et al.

(10) Patent No.: US 8,249,087 B2
(45) Date of Patent: Aug. 21, 2012

(54) COMMUNICATION SYSTEM AND COMMUNICATION METHOD

(75) Inventors: Hiroaki Takada, Nagoya (JP); Ryo Kurachi, Nagoya (JP); Yukihiro Miyashita, Yokkaichi (JP)

(73) Assignees: National University Corporation Nagoya University, Nagoya (JP); Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 12/450,918

(22) PCT Filed: Aug. 22, 2008

(86) PCT No.: PCT/JP2008/064997
§ 371 (c)(1),
(2), (4) Date: Oct. 19, 2009

(87) PCT Pub. No.: WO2009/025352
PCT Pub. Date: Feb. 26, 2009

(65) Prior Publication Data
US 2010/0124232 A1    May 20, 2010

(30) Foreign Application Priority Data
Aug. 22, 2007   (JP) .................................. 2007-216433

(51) Int. Cl.
*H04L 12/28*   (2006.01)
(52) U.S. Cl. ......................................................... 370/401
(58) Field of Classification Search .................. None
See application file for complete search history.

(56) References Cited

U.S. PATENT DOCUMENTS

| | | | |
|---|---|---|---|
| 6,360,152 B1 | 3/2002 | Ishibashi et al. | |
| 2002/0006139 A1* | 1/2002 | Kikkawa et al. | 370/502 |
| 2004/0083043 A1* | 4/2004 | Akiyama et al. | 701/48 |
| 2004/0162653 A1* | 8/2004 | Ban et al. | 701/35 |
| 2007/0133578 A1* | 6/2007 | Tani | 370/401 |
| 2008/0045217 A1* | 2/2008 | Kojima | 455/436 |
| 2008/0144626 A1* | 6/2008 | Bertinelli et al. | 370/392 |

FOREIGN PATENT DOCUMENTS

| | | |
|---|---|---|
| EP | 1 037 430 A1 | 9/2000 |
| JP | A-07-162508 | 6/1995 |
| JP | A-7-234826 | 9/1995 |
| JP | A-2000-284808 | 10/2000 |
| JP | A-2002-204249 | 7/2002 |
| JP | A-2005-159568 | 6/2005 |
| WO | WO99/22494 A1 | 5/1999 |
| WO | WO 2007/043608 A1 | 4/2007 |

OTHER PUBLICATIONS

Feb. 7, 2012 Office Action issued in Japanese Application No. 2007-216433 (with translation).

* cited by examiner

*Primary Examiner* — Otis L Thompson, Jr.
(74) *Attorney, Agent, or Firm* — Oliff & Berridge, PLC

(57) ABSTRACT

GW apparatuses send messages including data being sent from ECUs to a distribution apparatus without sending to an ECU. The distribution apparatus stores the messages on a database, and sends the messages to an ECU, and an ECU. In a case, the distribution apparatus sends the messages in a message sending order and the GW apparatuses relays the messages being sent from the distribution apparatus to the ECUs. The message sending order may be an order in which the distribution apparatus receives the messages an ascending (descending) order of values corresponding to message IDs applied to the messages or an ascending order of message received time of the messages.

12 Claims, 13 Drawing Sheets

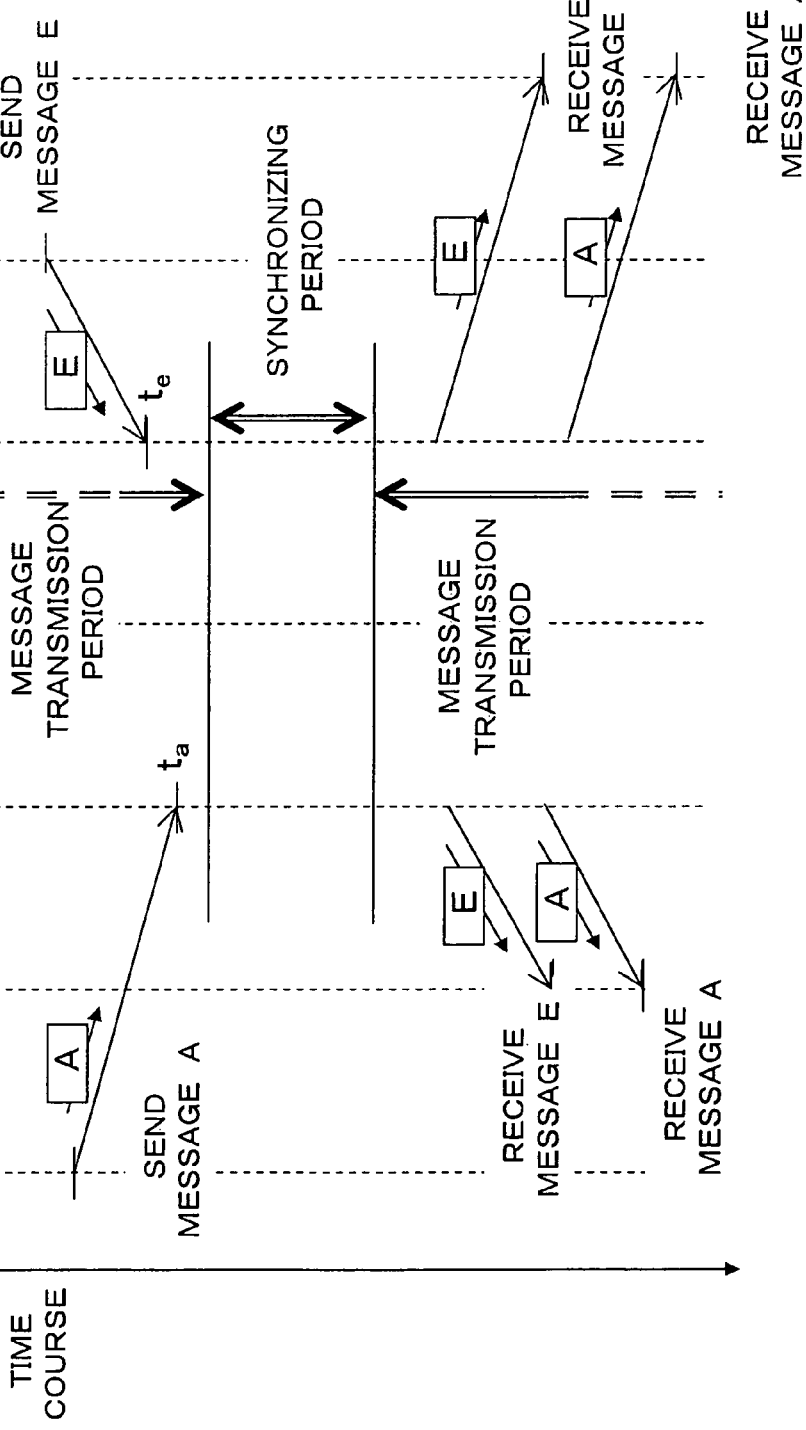

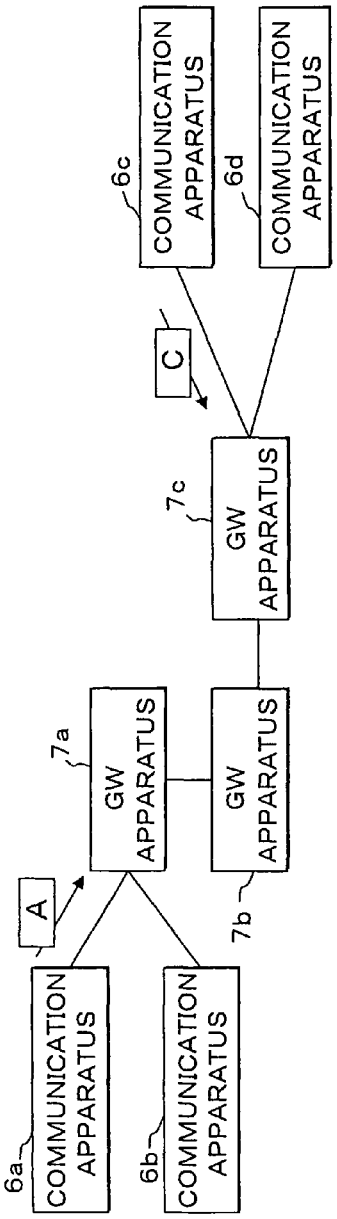
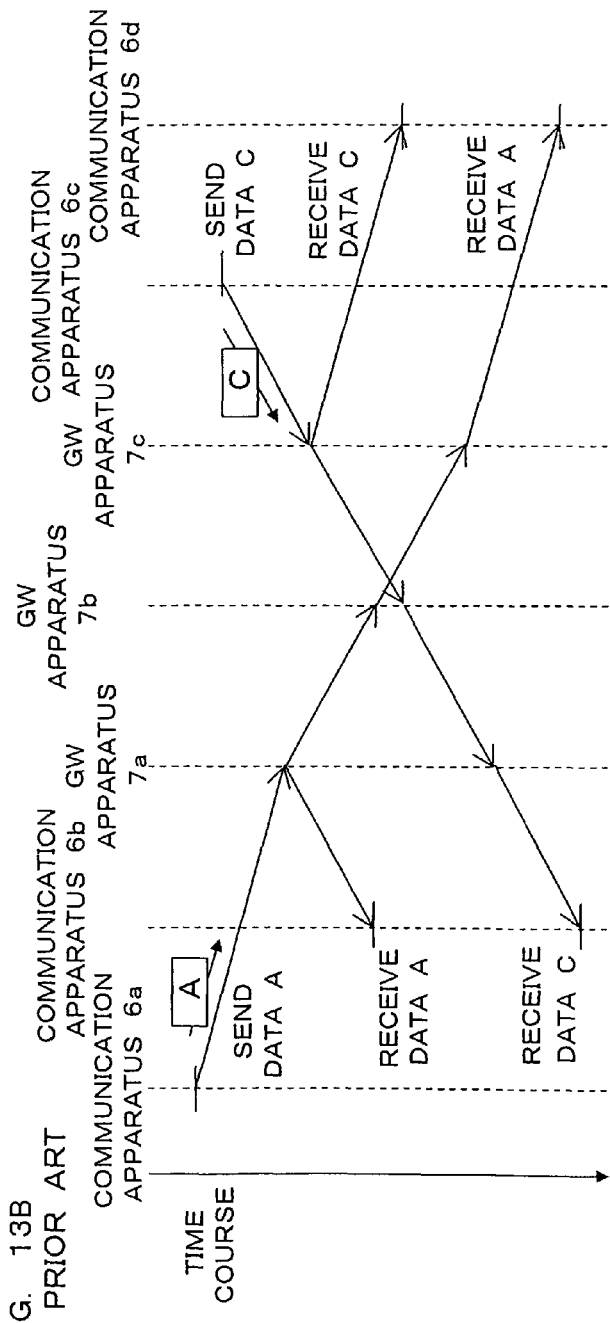
FIG. 13A PRIOR ART
FIG. 13B PRIOR ART

COMMUNICATION SYSTEM AND COMMUNICATION METHOD

This application is the national phase under 35 U.S.C. §371 of PCT International Application No. PCT/JP2008/064997 which has an International filing date of Aug. 22, 2008 and designated the United States of America.

BACKGROUND OF THE INVENTION

1. Field of the Invention

The present invention relates generally to a communication system including: a communication apparatus group consisting of a plurality of communication apparatuses that send and receive data; and one or more distribution apparatuses that store data sent from a communication apparatus and distribute stored data to each communication apparatus, and implementing data transmission between communication apparatuses of different communication apparatus groups by a distribution apparatus, in particular to such communication system that keeps an order of data sent from each communication apparatus and makes data reach to each communication apparatus in accordance with the kept order.

2. Description of the Related Art

It is recently known in several fields to utilize a system having many communication apparatuses, in which each communication apparatus is provided a certain function and connected with other communication apparatuses in order to perform variable operations through data exchange between many communication apparatuses. For example, it is known in a field of local area network (LAN) adapting for car to utilize electronic control units (ECUs) as the communication apparatuses, to make each ECU perform a certain operation and to exchange data between the ECUs, in order to provide various functions to be implemented by a system.

A number and a type are increased of the communication apparatuses connected to a communication medium in a system, proportionally to a specializing degree of the function provided to each communication apparatus, as well as an increasing degree of the functions performed by the system. Furthermore, the system is expected to perform much more various functions. Thus, each communication apparatus is required to share data and to interact with other communication apparatuses. Then, it results in an increase of exchanged data amount.

To accommodate the increase of exchanged data amount, communication apparatuses of the system is generally divided into some groups, and then each group is connected to a communication medium. This configuration can reduce communication traffic volume because of reducing the number of communication apparatuses connected to the communication medium. Thus, this configuration can prevent data collision and the like. Furthermore, it is thought to focus on data type treated by the groups of communication apparatus, and then to connect each group to each of communication mediums respectively having different communication speed. In such a configuration, a group treating a predetermined data type is connected with another group treating another predetermined data type, by a gateway apparatus that controls data transmission.

Patent Document 1 discloses that: ECUs in a field of LAN adapting for car are divided into some groups; each group is connected to each of communication lines of car; the communication lines of car are connected to each other by a gateway apparatus; priority information is added to the received and sent data to recognize data priority; the data priority is recognized through the priority information and the data having high priority is preferentially sent when the gateway apparatus performs data transmission between different communication lines of car, to prevent a transmission delay of data having high priority even when the communication lines of car take increased duty for data transmission.

Patent Document 1: Japanese Patent Application Laid-Open No. 2005-159568

SUMMARY OF THE INVENTION

In a case that a plurality of communication apparatuses are divided into a plurality of groups and each group is connected with another group through a gateway apparatus, the gateway apparatus sends data from a communication apparatus to another communication apparatus every time when the communication apparatus sends the data toward this another communication apparatus. A disadvantage of such conventional configurations lies in the fact that data arriving order happens to be different at each of the communication apparatuses, especially in the case that the data are sent and received through a plurality of gateway apparatuses.

FIG. 13 is a schematic view showing data arriving order at each communication apparatus when a gateway apparatus (GW apparatus) sends data to a communication apparatus or another gateway apparatus every time of receiving the data. FIG. 13A is a block diagram showing connection structures between communication apparatuses 6a, 6b, 6c, 6d and GW apparatuses 7a, 7b, 7c. As shown in FIG. 13A, the communication apparatuses 6a, 6b are connected with the GW apparatus 7a, and the communication apparatuses 6c, 6d are connected with the GW apparatus 7c. The GW apparatus 7a is connected with the GW apparatus 7c through the GW apparatus 7b. Thus, the GW apparatus 7a, 7b, 7c relay data transmitted between the communication apparatuses 6a, 6b, 6c, 6d.

FIG. 13B shows data arriving order of data A and data C at the communication apparatuses 6b, 6d, in configurations such as FIG. 13A. The data A is sent from the communication apparatus 6a, and the data C is sent from the communication apparatus 6c. When the communication apparatus 6a sends the data A, the data A arrives at the communication apparatus 6b through the GW apparatus 7a and arrives at the communication apparatus 6d through the GW apparatuses 7a, 7b, 7c. Similarly, when the communication apparatus 6c sends the data C, the data C arrives at the communication apparatus 6d through the GW apparatus 7c, and arrives at the communication apparatus 6b through the GW apparatuses 7c, 7b, 7a. Thus, as shown in FIG. 13B, the communication apparatus 6b receives the data A and the data C in this receiving order that is different from a receiving order of the communication apparatus 6d.

The present invention was made in view of such circumstances, and has a primary object to provide a communication system and a communication method that implements making each communication apparatus receive data in a data receiving order, with using a distribution apparatus which stores data sent from a communication apparatus, reads out a plurality of stored data, and sends the read plurality of data in a predetermined data sending order corresponding to the data receiving order in order to allow the read plurality of data arriving at all communication apparatuses in the same arriving order.

Another object of the present invention is to provide a communication system that implements making all communication apparatuses receive data in the same data receiving order corresponding to the data sending order with using configurations that the data sending order stored by the distribution apparatus is the same as the data receiving order in which the distribution apparatus receives data.

Another object of the present invention is to provide a communication system that implements making all communication apparatuses receive data in the same data receiving order corresponding to the data sending order with using configurations that the data sending order for sending data stored by the distribution apparatus is corresponding to identification information provided to the data sent by the distribution apparatus.

Another object of the present invention is to provide a communication system that implements making all communication apparatuses receive data in the same data receiving order corresponding to the data sending order with using configurations that the data sending order for sending data stored by the distribution apparatus is corresponding to an ascending order of data received time when data is received by a distribution apparatus.

A communication system according to first aspect of the present invention arranges a communication apparatus group including a plurality of communication apparatuses that send and receive data; and one or more distribution apparatuses that are connected with one or more communication apparatus groups among a plurality of communication apparatus groups, store data sent from each communication apparatus and distribute data to a communication apparatus in another group, wherein the distribution apparatus comprises: a storing means for storing data received from each communication apparatus; a means for sending the stored data to each communication apparatus in a predetermined data sending order, in order to make the sent data arrive at the each communication apparatus in a data arriving order corresponding to the data sending order.

A communication system according to second aspect of the present invention includes: the distribution apparatus comprising a storing means for storing data received from each communication apparatus in association with a data receiving order in which the data is received from the each communication apparatus; and the data receiving order being associated with each data that works as the predetermined data sending order.

A communication system according to third aspect of the present invention includes: identification information represented by numeric values that are applied to the data being sent from the communication apparatus; and the distribution apparatus that defines the predetermined data sending order with a ascending or descending order of identification information provided to the data stored by the storing means.

A communication system according to fourth aspect of the present invention includes the distribution apparatus that comprises a clocking means and a means for storing data received time when data is received from each communication apparatus, and an ascending order of the data received time works as the predetermined data sending order.

A communication system according to fifth aspect of the present invention includes the distribution apparatus that, at the presence of a plurality of the distribution apparatuses, comprises a means for sending data stored by the storing means to another distribution apparatus, together with the data received time of the stored data.

A communication method according to sixth aspect of the present invention utilizes a communication system having: a communication apparatus group including a plurality of communication apparatuses that send and receive data; and one or more distribution apparatuses that are connected with one or more communication apparatus groups among a plurality of communication apparatus groups, store data being sent from each communication apparatus and distribute data to a communication apparatus in another group, and includes the steps performed by the distribution apparatus of: storing data received from the communication apparatus;

sending the stored data to another distribution apparatus; receiving data sent from another distribution apparatus and synchronizing the stored data; and sending the stored data to each communication apparatus in a predetermined data sending order to make the stored data arrive at the each communication apparatus in a data arriving order corresponding to the predetermined data arriving order similar to the predetermined data sending order.

In accordance with an aspect of the present invention, data is sent from a communication apparatus, received by the distribution apparatus, and further distributed to each communication apparatus. At that time, the data is sent in a predetermined data sending order, in order to arrive at each communication apparatus in a data arriving order similar to the data sending order.

In accordance with an aspect of the present invention, data is sent to a communication apparatus in the predetermined data sending order that corresponds to a data receiving order in which a distribution apparatus receives data from a communication apparatus.

In accordance with an aspect of the present invention, data is sent by a distribution apparatus in the predetermined data sending order that corresponds to an ascending or descending order of an identification information applied to the data. Even when there is a plurality of distribution apparatuses, all the distribution apparatuses send data with using the same data sending order and the sent data arrive at each communication apparatus in the same data arriving order similar to the data sending order.

In accordance with an aspect of the present invention, a data received time is stored that represents time when a distribution apparatus receives data from a communication apparatus, and then data are sent in a data sending order corresponding to an ascending order of the data received time.

In accordance with an aspect of the present invention, when there is a plurality of distribution apparatuses, data and its data received time are transmitted between distribution apparatuses, in order to synchronize data stored by the distribution apparatuses. Thus, data arrive in a desired order even at a communication apparatus connected to a different communication line, because the distribution apparatus send data in the ascending order of the data received time.

In accordance with an aspect of the present invention, a GW apparatus does not send data every time of receiving the data, to each communication apparatus. Instead, the distribution apparatus sends data in a predetermined data sending order, in order to make the data arrive at each communication apparatus in a data arriving order similar to the data sending order. Each communication apparatus receives data in an order in which the distribution apparatus sends the data. Therefore, all communication apparatuses can receive data in the similar data receiving order, because data are sent to each communication apparatus by the distribution apparatus having functions for receiving and storing data.

In accordance with an aspect of the present invention, a data sending order can be kept and each communication apparatus can receive data in a similar data receiving order to that of another communication apparatus, because a distribution apparatus stores data and sends the stored data with using a data sending order corresponding to an order of received data toward another distribution apparatus and a communication apparatus.

In accordance with an aspect of the present invention, the distribution apparatus stores data, reads out the stored data and sends the read data in an ascending or descending order of identification information that is applied to the data in advance and represented by numeric values, alphabets or the like. Therefore, even when there is a plurality of distribution apparatuses, data are sent in a similar order and arrive at each communication apparatus in a similar order.

In accordance with an aspect of the present invention, a data received time is stored that represents time when a distribution apparatus receives data from a communication apparatus, and then data is sent in a data sending order corresponding to an ascending order of the data received time. Thus, data arrive at each communication apparatus in a data arriving order similar to the data sending order. Therefore, each communication apparatus can receive data in a data receiving order same as the data sending order.

In accordance with an aspect of the present invention, even when there is a plurality of distribution apparatuses, all distribution apparatuses share a data received time through transmission of data and data received time of the data. Thus, data arrive at each communication apparatus in a data arriving order similar to the data sending order. Therefore, each communication apparatus can receive data in a data receiving order similar to the data sending order.

The above and further objects and features of the invention will more fully be apparent from the following detailed description with accompanying drawings.

BRIEF DESCRIPTION OF THE DRAWINGS

FIG. 12 is a schematic view showing a message sending order and a message arriving order between distribution apparatuses and ECUs of the embodiment 3.

FIG. 13A and FIG. 13B are schematic views showing a data arriving order at each communication apparatus when data is sent from a gateway apparatus (GW apparatus) to a communication apparatus or to another GW apparatus every time of being received by the GW apparatus.

DESCRIPTION OF THE PREFERRED EMBODIMENTS

Hereinafter, an embodiment of the present invention is described in detail with reference to drawings. In following embodiments, a communication system according to the present invention is described in the context of a communication system adapting for car that utilizes the communication system according to the present invention for a LAN adapting for car connected to a plurality of ECUs to send and receive data.

Embodiment 1

Figure 1:
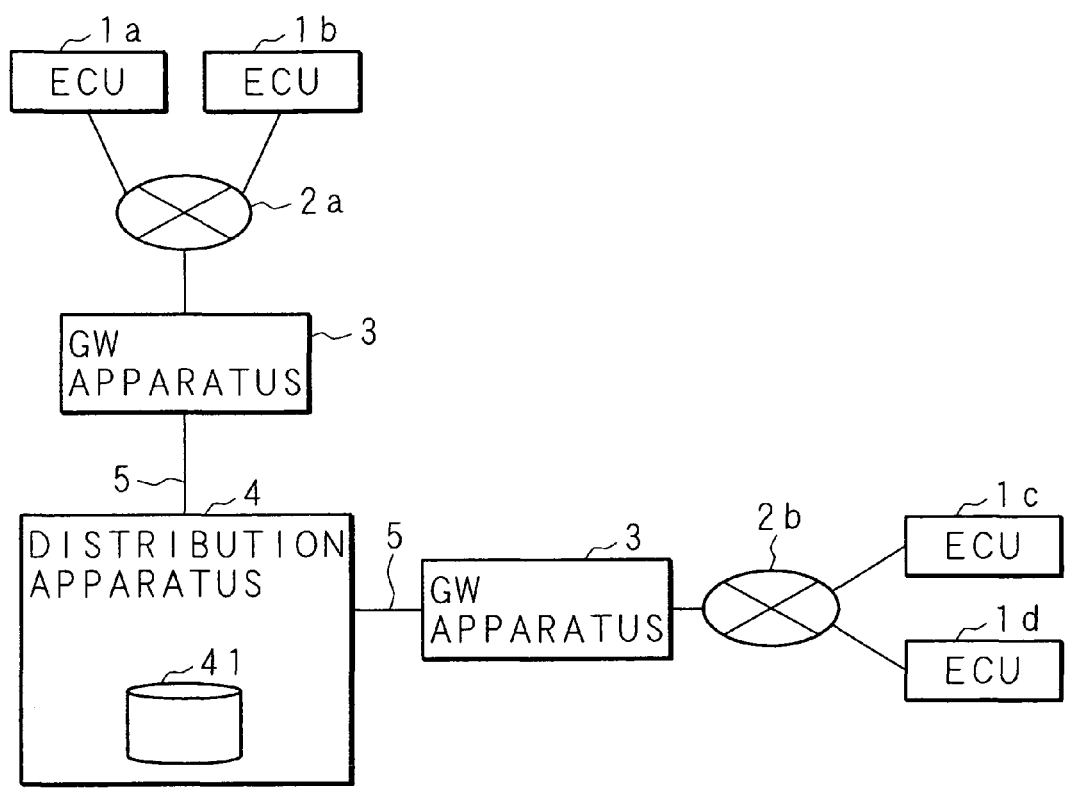
FIG. 1 is a block diagram showing components of a communication system adapting for car of an embodiment 1.

FIG. 1 is a block diagram showing components of a communication system adapting for car of embodiment 1. The communication system adapting for car of the embodiment 1 includes: electronic control units (ECUs) 1$a$, 1$b$, 1$c$, 1$d$ that work as communication apparatuses to send and receive data; communication lines 2$a$, 2$b$ that are respectively connected to each group of ECUs 1$a$, 1$b$, $c$, 1$d$; GW apparatuses 3, 3 that sequentially relay data transmission; a distribution apparatus 4 that stores data being sent from the ECUs 1$a$, 1$b$, 1$c$, 1$d$ and distributes the data to the ECUs 1$a$, 1$b$, 1$c$, 1$d$; a communication line 5 that connects the GW apparatuses 3, 3 and the distribution apparatus 4.

The distribution apparatus 4 is connected with the GW apparatuses 3, 3 through the communication line 5. The ECUs 1$a$, 1$b$ are connected with the GW apparatus 3 through the communication line 2$a$. Thus, the GW apparatus 3 relays data transmission between the ECUs 1$a$, 1$b$ and the distribution apparatus 4. Similarly, the ECUs 1$c$, 1$d$ are connected with another GW apparatus 3 through the communication line 2$b$. Thus, another GW apparatus 3 relays data transmission between the ECUs 1$c$, 1$d$ and the distribution apparatus 4.

As described above, the communication system adapting for car of the embodiment 1 is configured to be a trunking type network. While the ECUs 1$a$, 1$b$, 1$c$, 1$d$ are divided into a plurality of groups, data is transmitted in the communication system between the ECUs 1$a$, 1$b$, 1$c$, 1$d$ through the GW apparatuses 3, 3 and the distribution apparatus 4 that are connected to the communication line 5 referred to as a trunk.

A connection topology of the ECUs 1$a$, 1$b$, 1$c$, 1$d$ through the communication lines 2$a$, 2$b$ may be a bus topology, star topology, daisy chain topology, or the like. In the embodiment 1, the daisy chain topology is utilized for a connection through the communication line 5 between the GW apparatuses 3, 3 and the distribution apparatus 4.

The ECUs 1$a$, 1$b$, 1$c$, 1$d$ can send data including numerical information of several physical quantities, such as measured values, computed values and control values. Furthermore, the ECUs 1$a$, 1$b$, 1$c$, 1$d$ can associate with a microcomputer for an engine, brake or the like. For example, the ECU 1$a$ is connected with a sensor (not shown) for detecting rotation speeds of wheels (wheel speed), and works as an antilock brake system (ABS). The ECU 1$a$ controls the brake in accordance with the wheel speed detected through the sensor during braking time of the car, and sends data including measured values of the wheel speed to the communication line 2a.

The distribution apparatus 4 works basically as a relay apparatus that relays data transmission between the ECUs 1a, 1b, 1c, 1d and includes a storage region that works as a database 41. The distribution apparatus 4 collects data sent from the ECUs 1a, 1b, 1c, 1d, stores the collected data on the database 41, reads out from the database 41, and sends the read data to the ECUs 1a, 1b, 1c, 1d through the GW apparatuses 3, 3, to relay the data transmission. In other words, the distribution apparatus 4 is utilized as a starting point of sending data, and data is sent to each ECU 1a, 1b, 1c, 1d in a data sending order corresponding to an order in which the distribution apparatus 4 sends data, in the communication system adapting for car of the embodiment 1.

In the embodiment 1, data being transmitted between the ECUs 1a, 1b, 1c, 1d and the distribution apparatus 4 is a "message" which includes a plurality of data. In other words, each of the ECUs 1a, 1b, 1c, 1d sends a data constellation as a message, while the data constellation is generated by own operations of the ECUs 1a, 1b, 1c, 1d. The distribution apparatus 4 reads out data from a received message, and stores the read data on the database 41. At the time of sending a message to the ECUs 1a, 1b, 1c, 1d, the distribution apparatus 4 generates messages including the data being read out from the database 41, in accordance with need.

Figure 2:
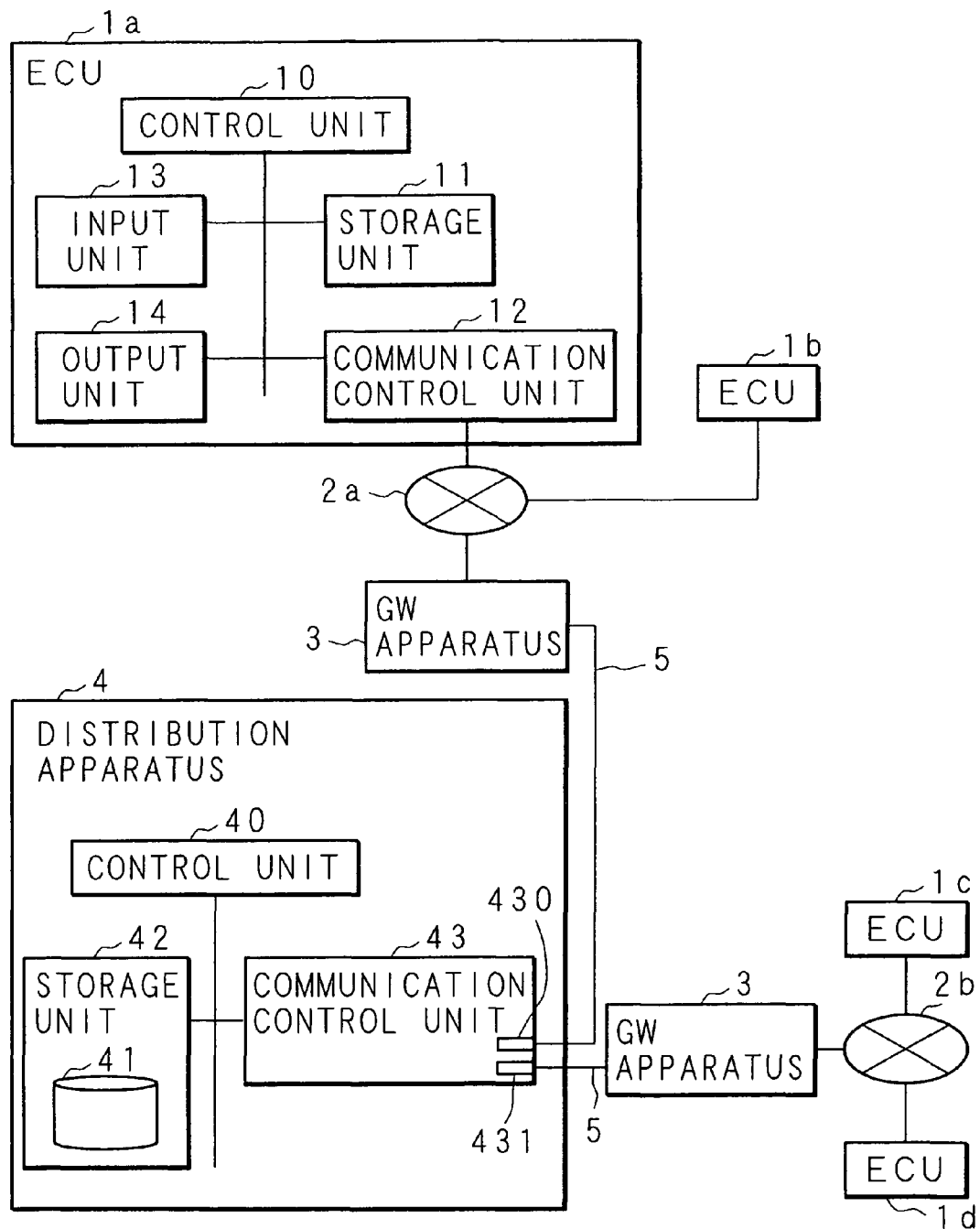
FIG. 2 is a block diagram showing inner components of an ECU and a distribution apparatus included in the communication system adapting for car of the embodiment 1.

FIG. 2 is a block diagram showing inner components of the ECU 1a and the distribution apparatus 4 included in the communication system adapting for car of the embodiment 1. The inner components of the ECU 1a are the same as those of the ECU 1b, 1c, 1d. Thus, the inner components of the ECU 1b, 1c, 1d will not be illustrated and described in detail.

The ECU 1a includes: a control unit 10 that controls each component described bellow; storage unit 11 utilizing non-volatile memory; communication control unit 12 connected to the communication line 2a; input unit 13 that inputs a signal from a sensor (not shown); and an output unit 14 that outputs a control signal to an object device to be controlled (not shown). Anyway, the input unit 13 or the output unit 14 may be alternatively provided to one or more ECUs among the ECUs 1a, 1b, 1c, 1d.

The control unit 10 of the ECU 1a is supplied with electric power from an electric power supply (not shown), such as an alternator or battery adapting for car, detects a signal representing measured values provided from a sensor (not shown) connected to the ECU 1a through the input unit 13, and sends a control signal through the output unit 14 to a controlled object device connected with the ECU 1a.

The storage unit 11 temporally stores several information generated during the operation of the control unit 10, a received message, and measured values represented by a signal being input from a sensor.

The communication control unit 12 has a network controller chip and implements communicating with the communication line 2a. The control unit 10 of the ECU 1a sends through the communication control unit 12 message including numerical information of several physical quantities, such as measured values, computed values and control values generated by own operations.

In addition, the control unit 10 of the ECU 1a receives through the communication control unit 12 message sent from the distribution apparatus 4 via the GW apparatus 3. The control unit 10 reads out several data from the received message, then the read data are utilized to control.

The distribution apparatus 4 includes: a control unit 40 that controls each component described bellow; storage unit 42 utilizing volatile memory; and a communication control unit 43 connected to the communication line 5.

The control unit 40 is supplied with electric power from an electric power supply (not shown), such as an alternator or battery adapting for car, reads out a control program stored in non-volatile inner memory (not shown), and executes the control program in order to control each component.

The storage unit 42 includes a storage region of a database 41 for storing data received from the ECUs 1a, 1b, 1c, 1d by the control unit 40. As a message being received from the ECUs 1a, 1b, 1c, 1d includes several types of data such as "wheel speed", "steering angle", and "oil temperature", the control unit 40 reads out a specific measured values, computed values or control values for each type of data from the received message, and stores the read values on the database 41.

The communication control unit 43 implements message transmission between the ECUs 1a, 1b, 1c, 1d and the distribution apparatus 4 through the GW 3, 3 that are connected with the distribution apparatus 4 via the communication line 5. In addition, the communication control unit 43 includes a plurality of connection ports: a connection port 430 that connects with ECUs 1a, 1b side of the communication line 5; and a connection port 431 that connects with ECUs 1c, 1d side of the communication line 5. The control unit 40 can discriminate the connection port 430 and the communication port 431.

It will be explained about relaying operations in which sent data from the ECUs 1a, 1b, 1c, 1d is relayed by the GW apparatuses 3, 3 and the distribution apparatus 4, in the communication system adapting for car described above.

Figure 3:
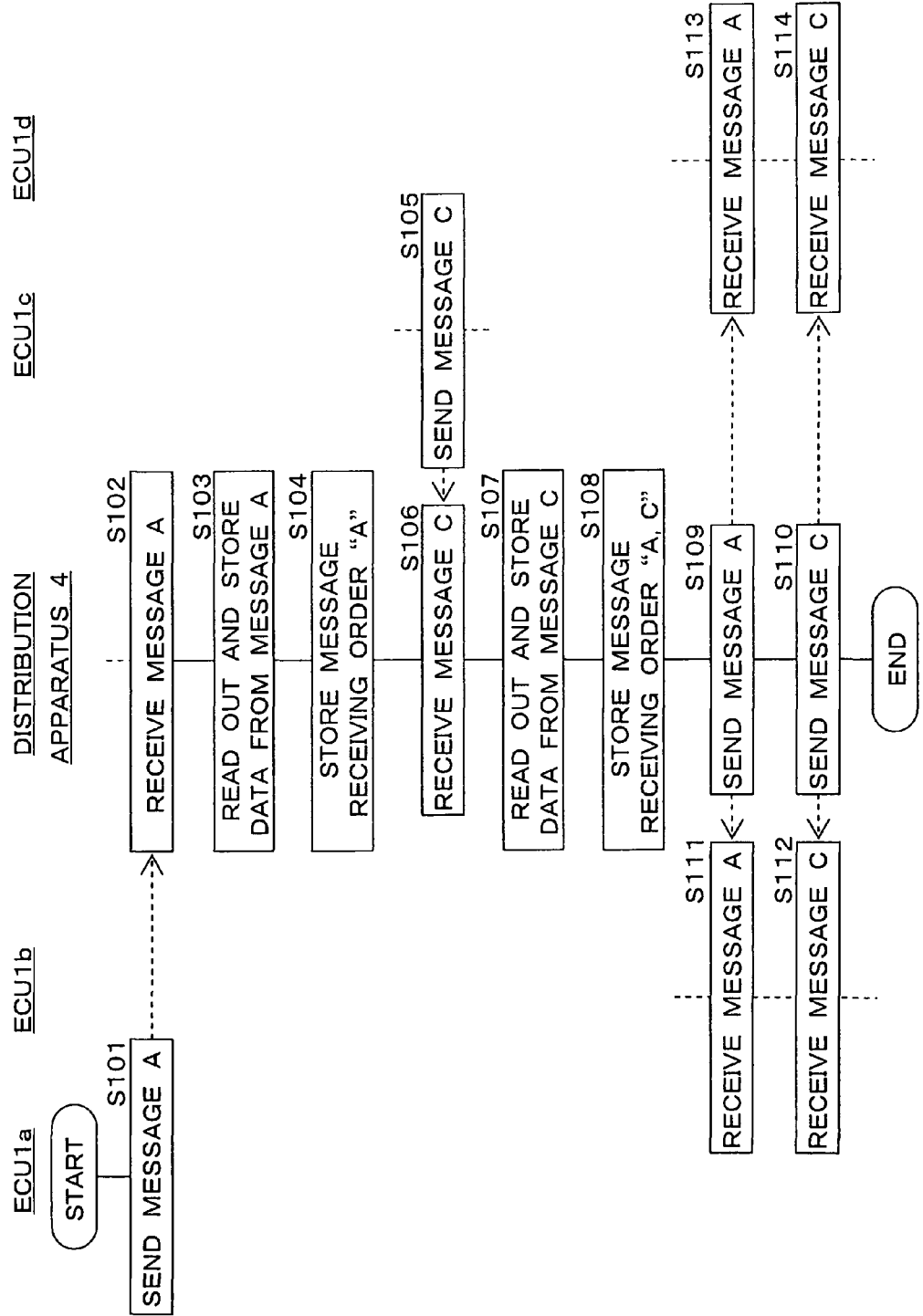
FIG. 3 is a flowchart showing one example of a procedure for transmitting data between the distribution apparatus and ECUs.

FIG. 3 is a flowchart showing one example of a procedure for transmitting data between the distribution apparatus 4 and the ECUs 1a, 1b, 1c, 1d. It should be noted that transmitting operations of the GW apparatuses 3, 3 are not illustrated in the flowchart of FIG. 3.

The control unit 10 of the ECU 1a sends a message A including data generated by own operations, to the distribution apparatus 4 though the GW apparatus 3 (step S101). At this time, the GW apparatus 3 sends the data received from the ECU 1a to the distribution apparatus 4, without sending the data to the ECU 1b.

The control unit 40 of the distribution apparatus 4 makes the connection port 430 at the ECUs 1a, 1b side of the communication control unit 43 receive the message A being sent from the ECU 1a (step S102), reads out data included in the message A to store on the database 41 (step S103), and stores a message receiving order "A" representing a received order of the message A (step S104).

During this time, the control unit 10 of the ECU 1c sends a message C including data generated by own operations, to the distribution apparatus 4 though the GW apparatus 3 (step S105). The GW apparatus 3 sends the data received from the ECU 1c to the distribution apparatus 4, without sending the data to the ECU 1d.

The control unit 40 of the distribution apparatus 4 makes the connection port 431 at the ECUs 1c, 1d side of the communication control unit 43 receive the message C being sent from the ECU 1c (step S106), reads out data included in the message C to store on the database 41 (step S107), and stores a message receiving order "A, C" in which a received order of the message C is added to the message receiving order "A" (step S108).

The control unit 40 makes the communication ports 430, 431 of the communication control unit 43 send the message A and then the message C in this order toward the ECUs 1b, 1d, respectively, in accordance with the storing message receiving order "A, C" (step S109, step S110).

Thus, the control unit 10 of the ECU 1b firstly receives the message A (step S111), and secondary receives the message C sent from the distribution apparatus 4 (step S112).

Similarly, the control unit 10 of the ECU 1d firstly receives the message A (step S113), and secondary receives the message C sent from the distribution apparatus 4 (step S114). Then, this procedure is completed.

As shown in the flowchart of FIG. 3, the control unit 40 of the distribution apparatus 4 stores on the database 41 data included in messages received from each ECU 1a, 1b, 1c, 1d, and sends these data stored by the distribution apparatus 4 in a sending order that is the same as the received order of these data. Thus, it is possible to make both the ECUs 1b, 1d receive the message A and then receive the message C, respectively, through keeping the sending order.

In embodiment 1 described above, the control unit 40 of the distribution apparatus 4 stores the received order representing an order in which messages are received. Such configurations may be implemented with queue processing technique, such as First In First Out, through storing received messages on the storage unit 42 and making the communication ports 430, 431 respectively send in a similar sending order.

Embodiment 2

In embodiment 2, it is illustrated one example where the GW apparatuses 3, 3 of the embodiment 1 are substituted with another distribution apparatuses. In other words, a communication system adapting for car of the embodiment 2 differs hardware components including a plurality of distribution apparatuses, instead of the GW apparatuses 3, 3, from the communication system adapting for car of the embodiment 1. Thus, configurations that are the same as those of the embodiment 1 are given the identical numerals to the embodiment 1 and, accordingly, will not be described in detail.

Figure 4:
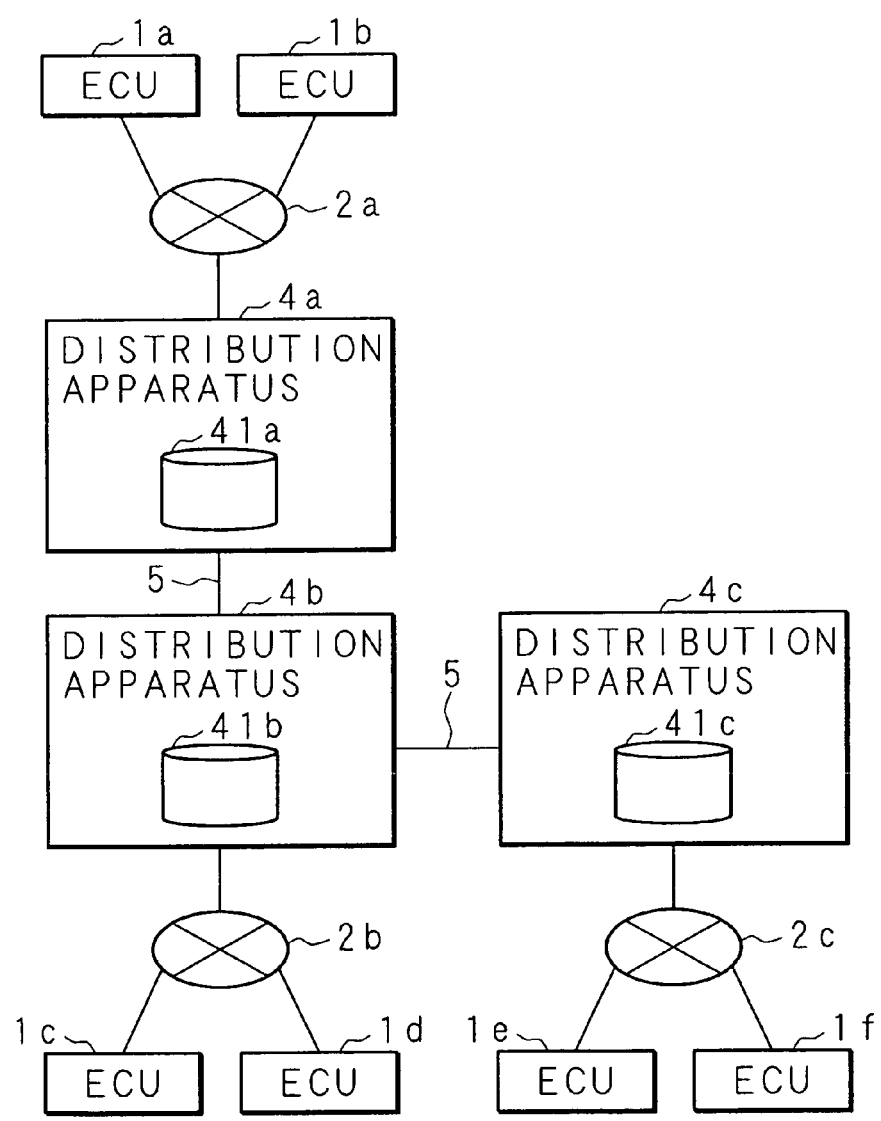
FIG. 4 is a block diagram showing components of a communication system adapting for car of an embodiment 2.

FIG. 4 is a block diagram showing components of a communication system adapting for car of the embodiment 2. The communication system adapting for car includes: ECUs 1a, 1b, 1c, 1d, 1e, 1f; communication lines 2a, 2b, 2c that are respectively connected to each group of ECUs 1a, 1b, 1c, 1d, 1e, 1f; distribution apparatuses 4a, 4b, 4c that store data included in a message sent from the ECUs 1a, 1b, 1c, 1d, 1e, 1f and distribute the data to the ECUs 1a, 1b, 1c, 1d, 1e, 1f; a communication line 5 that connects the distribution apparatuses 4a, 4b, 4c to each other.

The ECUs 1a, 1b are connected with the distribution apparatus 4a through the communication line 2a. The ECUs 1c, 1d are connected with the distribution apparatus 4b through the communication line 2b. The ECUs 1e, 1f are connected with the distribution apparatus 4c through the communication line 2c.

The distribution apparatuses 4a, 4b, 4c respectively include storage regions that work as databases 41a, 41b, 41c in order to read out and store data being sent from the ECUs 1a, 1b, 1c, 1d, 1e, 1f, similarly to the distribution apparatus 4 of the embodiment 1. The ECUs 1a, 1b send messages to the distribution apparatus 4a. The ECUs 1c, 1d send messages to the distribution apparatus 4b. The ECUs 1e, 1f send messages to the distribution apparatus 4c. Each of the ECUs 1a, 1a, 1b, 1c, 1d, 1e, 1f sends to the corresponding distribution apparatus 4a, 4b, 4c a message including data based on own function. Thus, each of the distribution apparatuses 4a, 4b, 4c, may store different type of data on own database 41a, 41b, 41c and may renew different type of data, respectively.

Each of the distribution apparatuses 4a, 4b, 4c can send data being stored on own database 41a, 41b, 41c to other distribution apparatuses 4a, 4b, 4c in order to synchronize data contents of the databases 41a, 41b, 41c. Then, each of the distribution apparatuses 4a, 4b, 4c reads out data from own the synchronized database 41a, 41b, 41c and distributes the read data to each ECU 1a, 1a, 1b, 1c, 1d, 1e, 1f. These configurations lead advantages that all the ECUs 1a, 1a, 1b, 1c, 1d, 1e, 1f even connected to different communication lines 2a, 2b, 2c can share the same data.

In the communication system adapting for car of the embodiment 2 described above, the distribution apparatuses 4a, 4b, 4c are connected to the communication line 5 working as a trunk, store data received from the ECUs 1a, 1a, 1b, 1c, 1d, 1e, 1f, read out data from synchronized databases 41a, 41b, 41c, and send the read data to the ECUs 1a, 1a, 1b, 1c, 1d, 1e, 1f. Thus, the communication system adapting for car of the embodiment 2 has a trunking type network for relaying message transmission between the ECUs 1a, 1a, 1b, 1c, 1d, 1e, 1f.

The ECUs 1a, 1a, 1b, 1c, 1d, 1e, 1f have similar components to those of the ECUs 1a, 1b, 1c, 1d of the embodiment 1. Thus, configurations that are the same as those of the embodiment 1 are given the identical numerals to the embodiment 1 and, accordingly, will not be described in detail.

Figure 5:
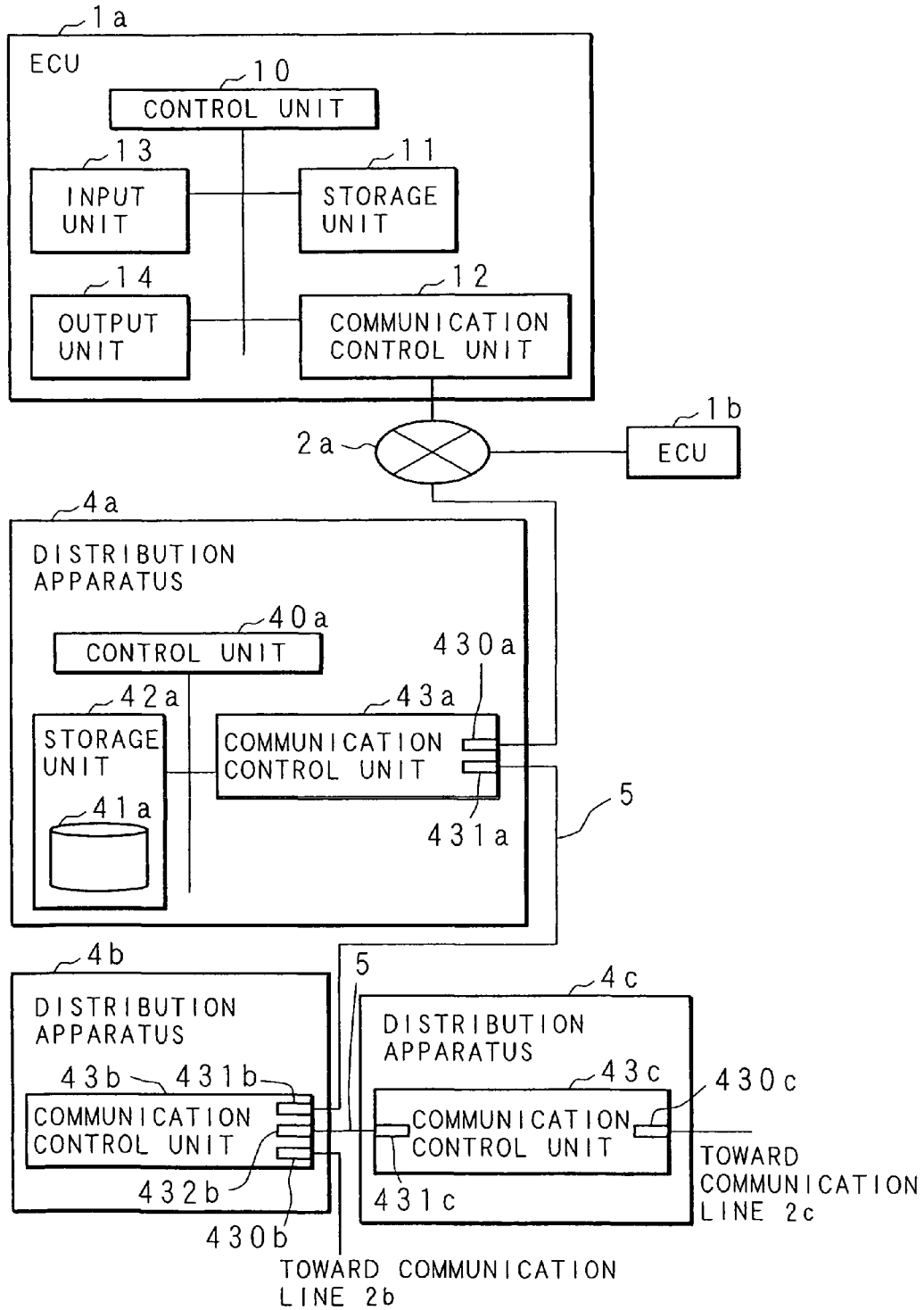
FIG. 5 is a block diagram showing inner components of an ECU and a distribution apparatus included in the communication system adapting for car of the embodiment 2.

FIG. 5 is a block diagram showing inner components of the ECU 1a and the distribution apparatus 4a included in the communication system adapting for car of the embodiment 2. The inner components of the distribution apparatus 4a are similar to those of the distribution apparatuses 4b, 4c. Thus, the inner components of the distribution apparatus 4b, 4c will not be described in detail.

The distribution apparatus 4a includes: a control unit 40a that controls each component described bellow; storage unit 42a utilizing volatile memory; and a communication control unit 43a connected to the communication line 2a and to the communication line 5.

The control unit 40a is supplied with electric power from an electric power supply (not shown), such as an alternator or battery adapting for car, reads out a control program stored in non-volatile inner memory (not shown), and executes the control program in order to control each component.

The storage unit 42a includes a storage region of a database 41a for storing data received from the ECUs 1a, 1b, 1c, 1d, 1e, 1f by the control unit 40a. As a message received from the ECUs 1a, 1b, 1c, 1d, 1e, 1f includes several types of data such as "wheel speed", "steering angle", and "oil temperature", the control unit 40a reads out specific measured values, computed values or control values for each type of data from the received message, and stores the read values on the database 41a.

The communication control unit 43a implements message transmission between the ECUs 1a, 1b and the distribution apparatus 4b. In addition, the communication control unit 43a includes a plurality of connection ports: a connection port 430a that connects with ECUs 1a, 1b through the communication line 2a; and a connection port 431a that connects with the distribution apparatus 4b through the communication line 5. The control unit 40a can discriminate the connection port 430a and the communication port 431a.

Similarly, the communication control unit 43b of the distribution apparatus 4b includes a plurality of connection ports 430b, 431b, 432b. The connection port 430b is connected with the ECUs 1c, 1d through the communication line 2b. The communication port 431b is connected with the distribution apparatus 4a through the communication line 5. The connection port 432b is connected with the distribution apparatus 4c through the communication line 5. The control unit 40b can discriminate the connection ports 430b, 431b, 432b. Similarly, the communication control unit 43c of the distribution apparatus 4c includes a plurality of connection ports 430c, 431c. The connection port 430c is connected with the ECUs 1e, 1f through the communication line 2c. The connection port 431c is connected with the distribution apparatus 4b through the communication line 5. The control unit 40c can discriminate the connection ports 430c, 431c.

The control unit 40a of the distribution apparatus 4a sends a message including data that is sent from the ECUs 1a, 1b and is utilized for renewing, from the communication control unit 43a to the distribution apparatuses 4b, 4c, in order to synchronize the databases 41a, 41b, 41c. The control unit 40a of the distribution apparatus 4a makes the communication control unit 43a receive messages similarly sent from the distribution apparatuses 4b, 4c, reads out data from the received messages, and stores the read data on the database 41a.

It will be explained about message transmission operations of the ECUs 1a, 1b, 1c, 1d, 1e, 1f and of the distribution apparatuses 4a, 4b, 4c, in the communication system adapting for car described above. Basically, the ECUs 1a, 1b, 1c, 1d, 1e, 1f and the distribution apparatuses 4a, 4b, 4c are configured to perform an operation at a predetermined interval. One interval consists of a message transmission period for transmitting messages between the distribution apparatuses 4a, 4b, 4c and a synchronizing period for synchronizing databases 41a, 41b, 41c through the message transmission between the distribution apparatuses 4a, 4b, 4c.

The distribution apparatuses 4a, 4b, 4c receive messages from the ECUs 1a, 1b, 1c, 1d, 1e, 1f, read out data from the received messages, and store the read data on own database 41a, 41b, 41c, during the message transmission period. After storing new data on own database 41a, 41b, 41c, the distribution apparatuses 4a, 4b, 4c synchronize the databases 41a, 41b, 41c. During the following message transmission period, the distribution apparatuses 4a, 4b, 4c send to the ECUs 1a, 1b, 1c, 1d, 1e, 1f data being read out from the synchronized databases 41a, 41b, 41c as messages.

In the embodiment 2, when the distribution apparatuses 4a, 4b, 4c send messages to the ECUs 1a, 1b, 1c, 1d, 1e, 1f during the message transmission period, the messages are sent in a message sending order that corresponds to message IDs applied to the messages.

The message ID is identification information represented by previously defined numeric values in accordance with combination of data included in the message. Through the message ID, the ECUs 1a, 1b, 1c, 1d, 1e, 1f and the distribution apparatuses 4a, 4b, 4c can recognize whether a message includes data of "wheel speed", "steering angle", "oil temperature" or the like. The message ID may be represented by binary string, such as "10" and "500", because the message is sent in a form of binary digital signal. Alternatively, the message ID may be represented by alphabets or marks in addition to the binary string, in the case that the message ID is in a form of digital signal having alphabets or marks.

Figure 6:
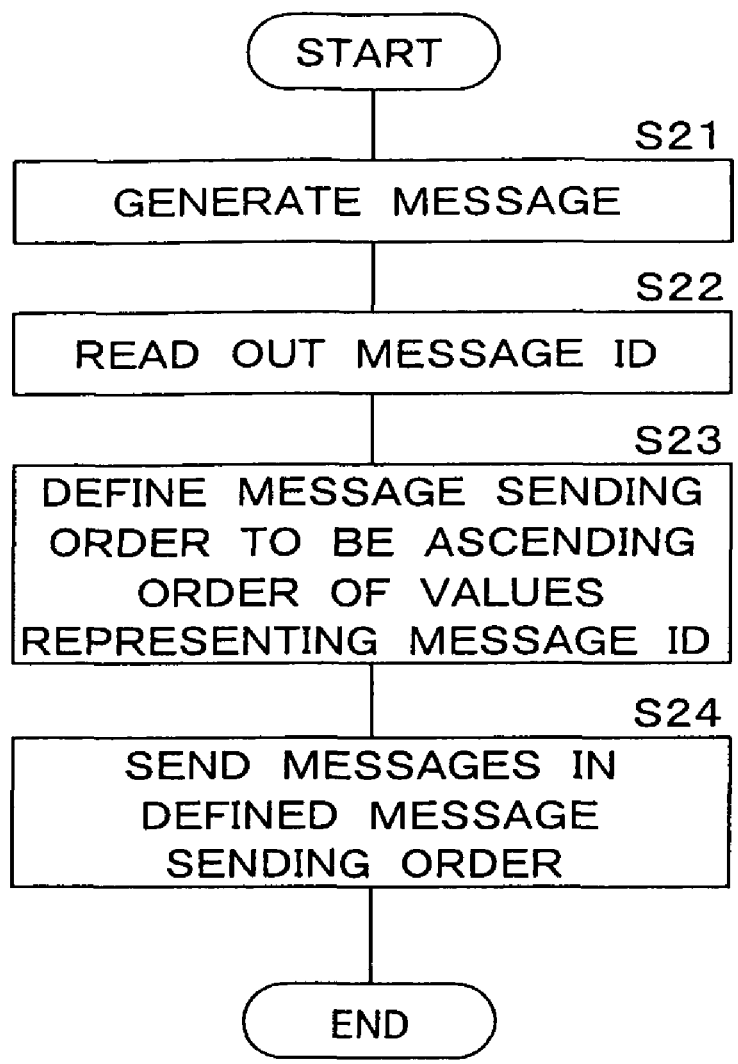
FIG. 6 is a flowchart showing one example of a procedure for sending data to an ECU by a control unit of the distribution apparatus of the embodiment 2 after a synchronizing operation.

FIG. 6 is a flowchart showing one example of a procedure for sending data to the ECUs 1a, 1b by the control unit 40a of the distribution apparatus 4a of the embodiment 2 after a synchronizing operation. The procedure performed by the control unit 40a of the distribution apparatus 4a is similar to those performed by the control units 40b, 40c of the distribution apparatuses 4b, 4c. Thus, procedures performed by performed by the control units 40b, 40c will not be described in detail.

After synchronizing, the control unit 40a of the distribution apparatus 4a generates a message including data to be sent to the ECUs 1a, 1b that are connected with the distribution apparatus 4a through the communication line 2a (step S21), and reads out the message ID applied to the message (step S21). The control unit 40a defines a message sending order that is an ascending order of the values representing the message ID (step S23). The control unit 40a makes the communication port 430a send each message in accordance with the message sending order defined at the step S23, in order to send the message through the communication line 2a to the ECUs 1a, 1b (step S24).

In addition, the procedure shown in the flowchart of FIG. 6 is performed even by the distribution apparatuses 4b, 4c during the message transmission period. Thus, all the distribution apparatuses 4a, 4b, 4c send messages in the same message sending order that is an ascending order of the values representing the message ID.

Figure 7:
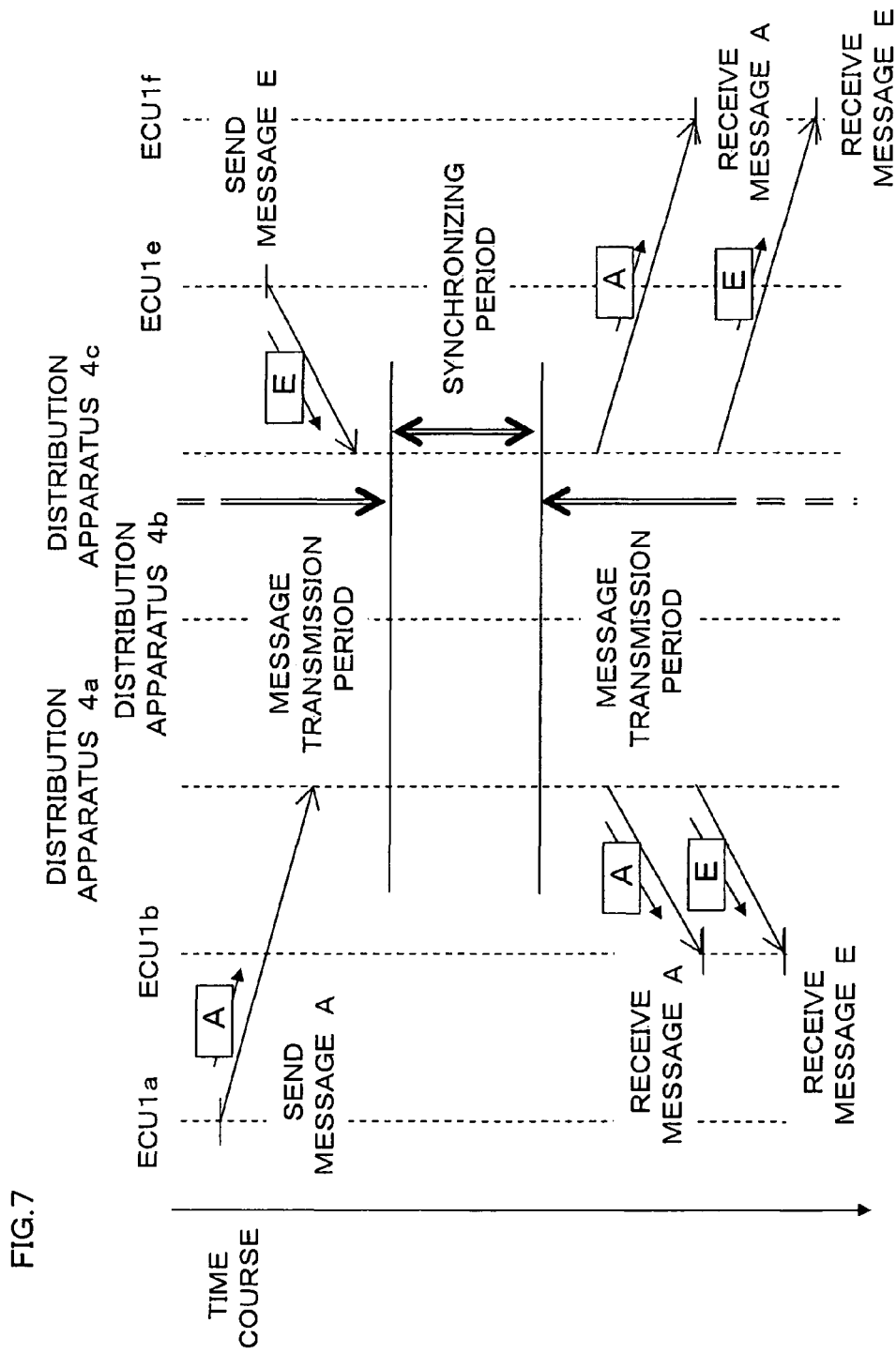
FIG. 7 is a schematic view showing a message sending order and a message arriving order between distribution apparatuses and ECUs of the embodiment 2.

FIG. 7 is a schematic view showing a message sending order and a message arriving order between distribution apparatuses 4a, 4b, 4c and ECUs 1a, 1b, 1e, 1f of the embodiment 2. In FIG. 7, a message arriving order is illustrated in which a message A being sent from the ECU 1a and a message E being sent from the ECU 1e arrive at the ECUs 1b, 1f, while a Y-axis represents time course. In the following description explaining the embodiment 2 with FIG. 7, the values of the message ID applied to the message A are illustrated to be smaller than those of the message ID applied to the message E, for illustration purpose.

The message A is sent from the ECU 1a during the message transmission period, received by the distribution apparatus 4a that is connected with the ECU 1a through the communication line 2a, and stored on the database 41a. Similarly, the message E being sent from the ECU 1e during the message transmission period is received by the distribution apparatus 4c, and stored on the database 41c.

Then, the databases 41a, 41b, 41c of the distribution apparatuses 4a, 4b, 4c are synchronized during the synchronizing period. Thus, the data included in the message A being sent from the ECU 1a is sent from the distribution apparatus 4a to the distribution apparatuses 4b, 4c and stored on the databases 41b, 41c, too. Similarly, the data included in the message E being sent from the ECU 1e is sent from the distribution apparatus 4c to the distribution apparatuses 4a, 4b, and stored on the databases 41a, 41b, too.

During the following message transmission period, the message A and the message E are respectively sent from the distribution apparatuses 4a, 4c to the ECUs 1b, 1f that are respectively connected with the distribution apparatuses 4a, 4c, as the ECUs 1b, 1f require the data included in the message A and the message E, respectively. At this time, the control units 40a, 40c of the distribution apparatuses 4a, 4c respectively send the message A at first and the message E at second, because the message A has values corresponding to the message ID smaller than those of the message E.

Thus, not only the ECU 1b but also the ECU 1f can receive the message A at first and the message E at second, as shown in FIG. 7.

In the embodiment 2, the distribution apparatuses 4a, 4b, 4c send the message A at first and the message E at second because the message A has values corresponding to the message ID smaller than those of the message E. This message sending order is defined, independently whether the time when the message E is sent from the ECU 1e is earlier than the time when the message A is sent from the ECU 1a or not. In other words, the distribution apparatuses 4a, 4c send the message A at first and the message E at second, even in the case that the time when the message E is sent from the ECU 1e is earlier than the time when the message A is sent from the ECU 1a, contrary to the FIG. 7.

In the embodiment 2, the message sending order is an ascending order of the values representing the message ID. However, it should be noted that the present invention is not limited to these configurations. The message sending order may be a descending order of the values representing the message ID.

In the embodiment 2, there is a plurality of distribution apparatuses 4a, 4b, 4c. However, it should be noted that the present invention is not limited to these configurations. A communication system adapting for car may have one distribution apparatus 4, such as illustrated in the embodiment 1, and the control unit 40 of the distribution apparatus 4 may perform the procedure shown in the flowchart of FIG. 6. Even in such configurations, all the ECUs 1a, 1b, 1c, 1d receive messages in the similar message receiving order.

Embodiment 3

In the embodiment 2, the distribution apparatuses 4a, 4b, 4c are illustrated to send messages in a message sending order that is an ascending order of the values representing the message IDs applied to the messages. On the other hand, the distribution apparatuses 4a, 4b, 4c in embodiment 3 store a message received time when the message is received from an ECU and utilizes a message sending order that is ascending order of the message received time.

A communication system adapting for car of the embodiment 3 includes several apparatuses whose components and relations of connection are similar to those of several apparatuses of the embodiment 2. The communication system adapting for car of the embodiment 3 differs distribution apparatuses 4a, 4b, 4c including clock units for obtaining the time when a message is received, from the communication system adapting for car of the embodiment 2. Thus, configurations that are the same as those of the embodiment 1 and the embodiment 2 are given the identical numerals to the embodiment 1 and the embodiment 2 and, accordingly, will not be described in detail.

Figure 8:
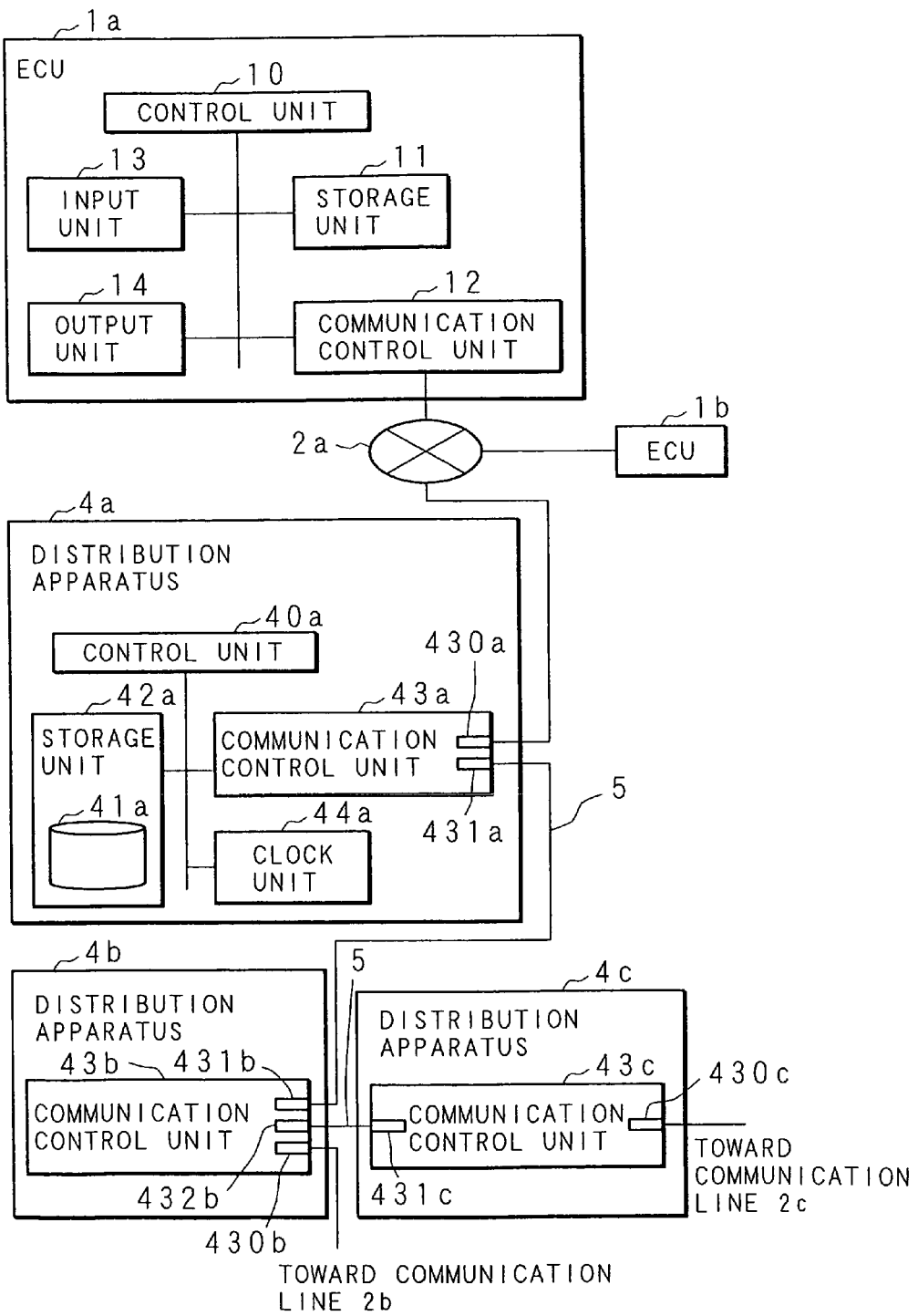
FIG. 8 is a block diagram showing inner components of an ECU and distribution apparatuses included in a communication system adapting for car of an embodiment 3.

FIG. 8 is a block diagram showing inner components of the ECU 1a and the distribution apparatus 4a included in a communication system adapting for car of an embodiment 3. The inner components of the distribution apparatus 4a are similar to those of the distribution apparatuses 4b, 4c. Thus, the inner components of the distribution apparatuses 4b, 4c will not be described in detail.

The distribution apparatus 4a includes a control unit 40a, storage unit 42a, communication control unit 43a, and further a clock unit 44a working as a timer.

The clock unit 44a produces a time stamp based on calculation with using a predetermined frequency (coordinate universal time: UTC) to work as a timer. The control unit 40a can obtain time from the stamp produced by the clock unit 44a. It should be noted that the clock unit 44 may utilize a calculated values with a predetermined frequency as the received time, instead of UTC.

It is preferred to synchronize the time calculated by the clock units 44a, 44b, 44c of the distribution apparatuses 4a, 4b, 4c with a proper accuracy.

When receiving a message, the control unit 40a obtains a message received time from the clock unit 44a and stores the message received time in association with the message or with the data included in the message. As sending and receiving a message including data to and from the other distribution apparatuses 4b, 4c in order to synchronize the databases 41a, 41b, 41c, the control unit 40a sends and receives the message received time in addition to the message. Thus, messages are sent to the ECUs 1a, 1b, 1c, 1d, 1e, 1f in a message sending order that is an ascending order of the message received time.

Next, it will be described about operations that the control unit 40a of the distribution apparatus 4a of the embodiment 3 stores a message received time when a message is received, sends and receives a message with a message received time in order to synchronize the database 41a with the other databases 41b, 41c, and sends messages to the ECUs 1a, 1b, 1c, 1d, 1e, 1f in a message sending order based on the message received time.

Figure 9:
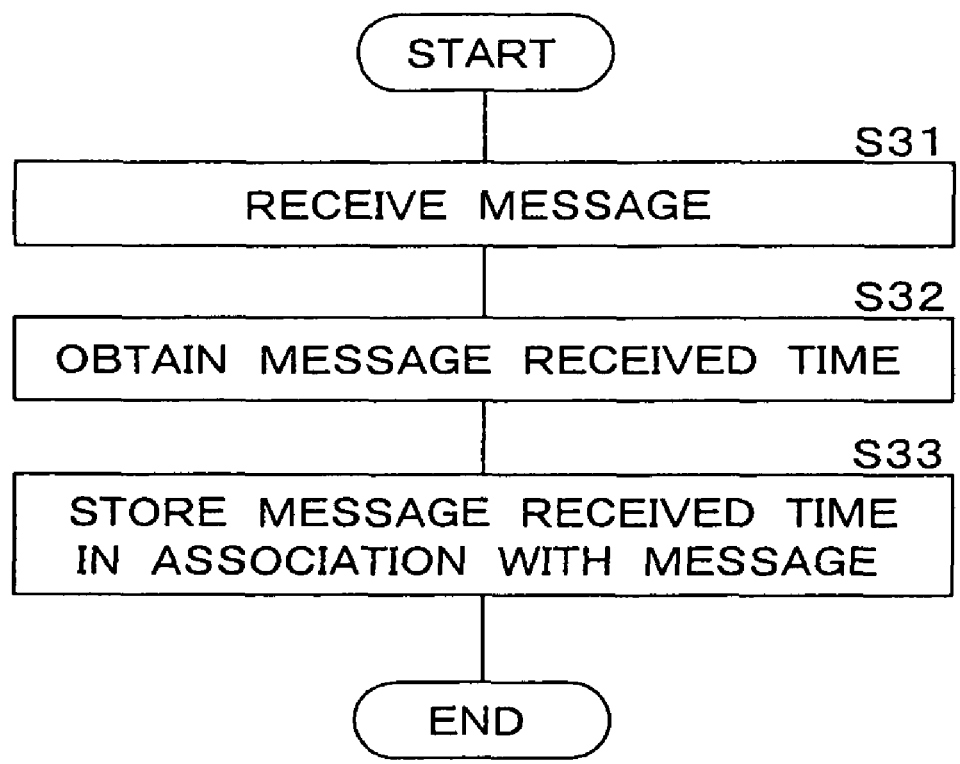
FIG. 9 is a flowchart showing one example of a procedure for receiving a message from an ECU by a control unit of a distribution apparatus of the embodiment 3.

FIG. 9 is a flowchart showing one example of a procedure for receiving a message from the ECUs 1a, 1b by the control unit 40a of the distribution apparatuses 4a of the embodiment 3. The procedure of the control unit 40a of the distribution apparatus 4a is similar to those of the control units 40b, 40c of the distribution apparatuses 4b, 4c. Thus, the procedures of the control units 40b, 40c of the distribution apparatuses 4b, 4c will not be described in detail.

The control unit 40a of the distribution apparatus 4a receives a message from the ECU 1a or the ECU 1b (step S31), and obtains the time when the message is received (message received time) from the clock unit 44a (step S32). The control unit 40a stores the obtained message received time together with the message (step S33), and completes the procedure for receiving a message from the ECU 1a or the ECU 1b.

The control unit 40a of the distribution apparatus 4a performs the procedure shown in the flowchart of FIG. 9, every time of receiving a message. Then, the control unit 40a of the distribution apparatus 4a synchronizes data contents of the databases 41a, 41b, 41c, while associating with the other distribution apparatuses 4b, 4c.

Figure 10:
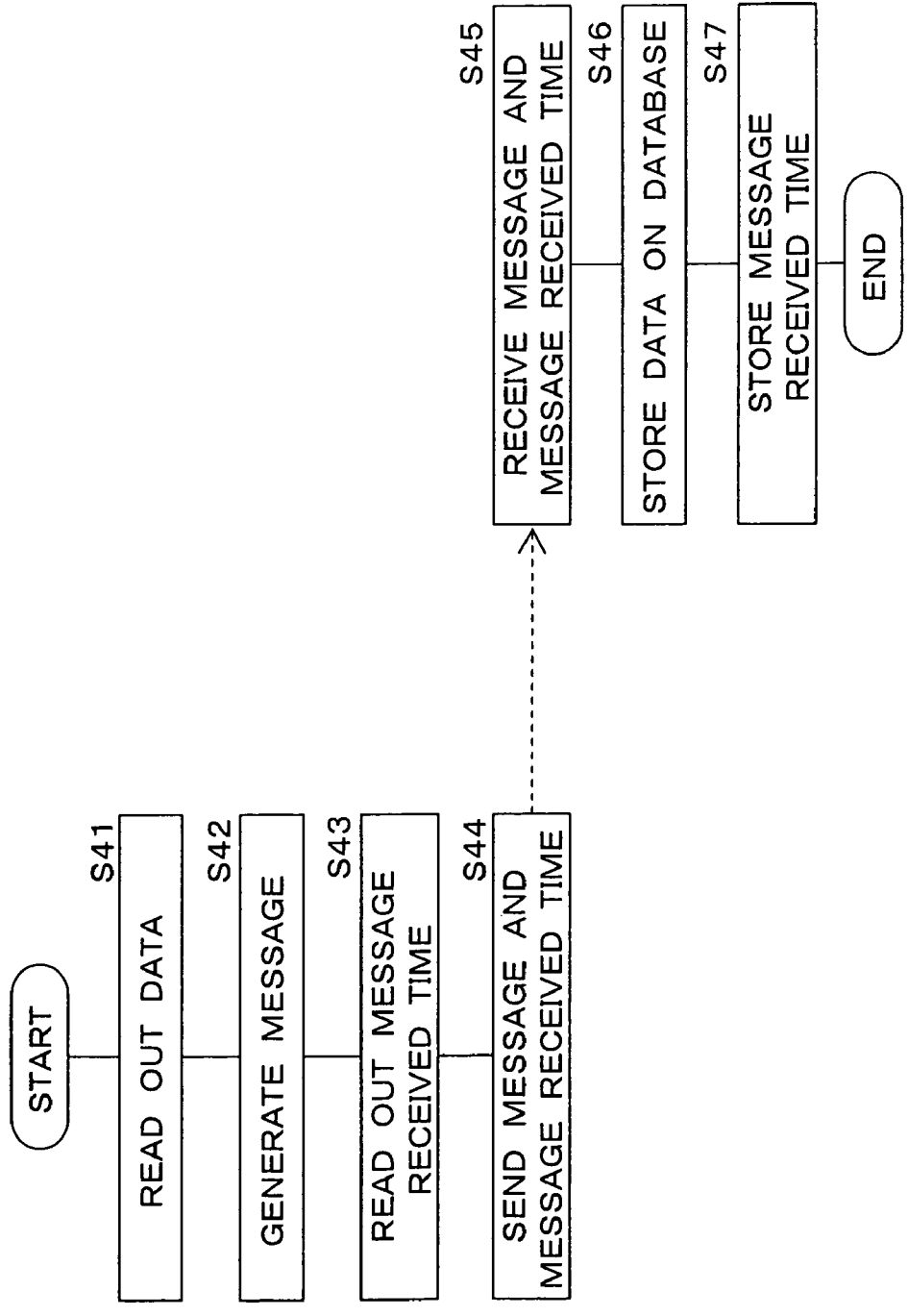
FIG. 10 is a flowchart showing one example of a procedure for sending a message to another distribution apparatus by the control unit of the distribution apparatus of the embodiment 3, in order to synchronize databases.

FIG. 10 is a flowchart showing one example of a procedure for sending a message to the distribution apparatus 4b by the control unit 40a of the distribution apparatus 4a of the embodiment 3, in order to synchronize the databases 41a, 41b, 41c. The procedure performed by the control unit 40a of the distribution apparatus 4a is similar to procedures performed by the control units 40b, 40c of the distribution apparatuses 4b, 4c. Thus, the procedures performed by the control units 40b, 40c of the distribution apparatuses 4b, 4c will not be described in detail.

The control unit 40a of the distribution apparatus 4a reads out data from the database 41a during the synchronizing period in order to synchronize the databases 41a, 41b, 41c (step S41), and then generates a message (step S42). At this time, the control unit 40a reads out a message received time that is stored in association with the read data (step S43), and sends the generated message and the message received time to the distribution apparatus 4b (step S44).

The control unit 40b of the distribution apparatus 4b receives the generated message and the message received time being sent from the distribution apparatus 4a (step S45), reads out data from the received message to store the read data on the database 41b (step S 46), and stores the message received time in association with the stored data (step S47).

The control units 40a, 40b, 40c of the distribution apparatuses 4a, 4b, 4c synchronize data contents of the databases 41a, 41b, 41c and share the message received time, through respectively performing the procedure shown in the flowchart of FIG. 10.

Figure 11:
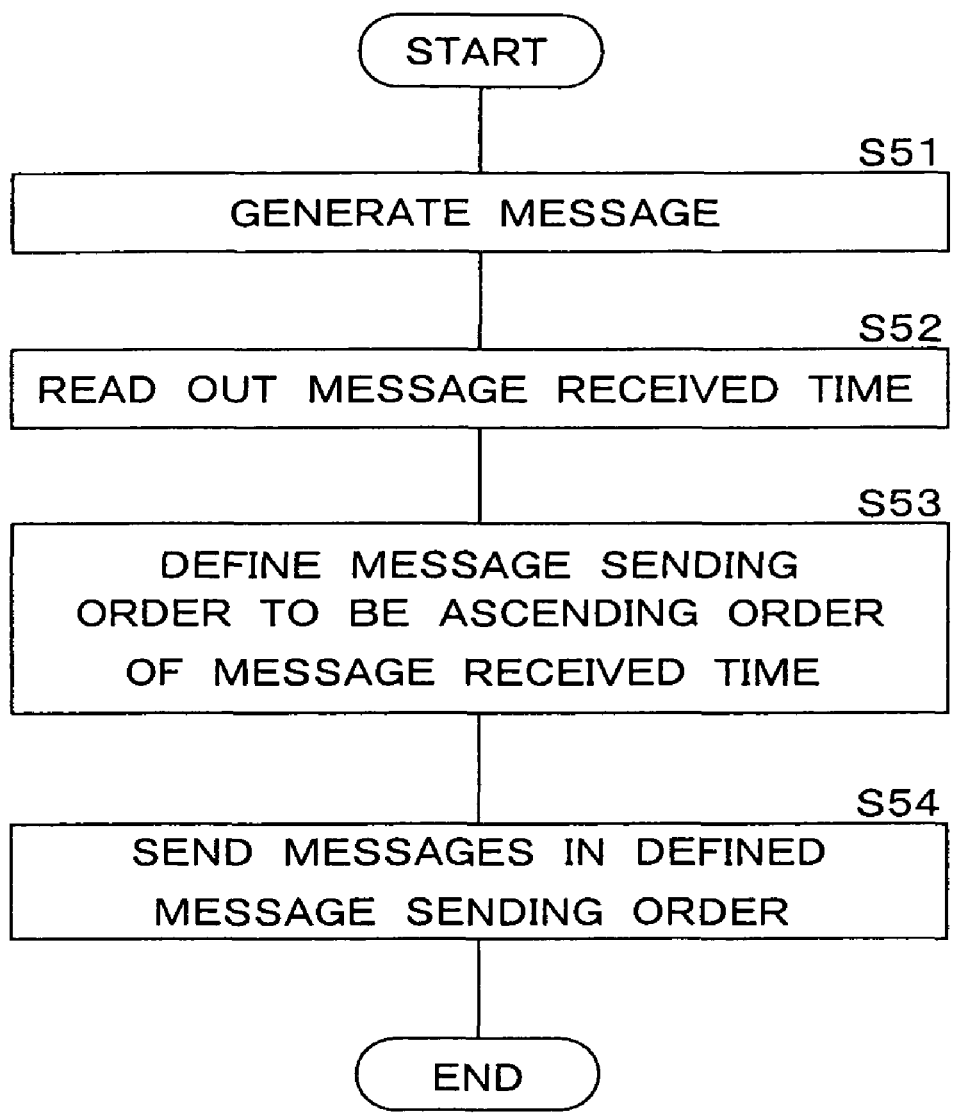
FIG. 11 is a flowchart showing one example of a procedure for sending to an ECU a message being read from a database by the control unit of the distribution apparatus of the embodiment 3.

FIG. 11 is a flowchart showing one example of a procedure for sending to the ECUs 1a, 1b a message being read from the database 41a by the control unit 40a of the distribution apparatus 4a of the embodiment 3. The procedure performed by the control unit 40a of the distribution apparatus 4a is similar to procedures performed by the control units 40b, 40c of the distribution apparatuses 4b, 4c. Thus, the procedures performed by the control units 40b, 40c of the distribution apparatuses 4b, 4c will not be described in detail.

After completing the synchronizing operation, the control unit 40a of the distribution apparatus 4a generates during the message transmission period a message including data that should be sent to the ECUs 1a, 1b connected with the distribution apparatus 4a through the communication line 2a (step S51), and reads out a message received time corresponding to the generated message (step S52). It should be noted that the message received time corresponding to the generated message may be a received time in the case that the same messages are sent from ECUs. In addition, it should be noted that, in the case that a plurality of data are combined in accordance with need and incorporated into the message, the message received time corresponding to the generated message may be an earliest message received time among a plurality of message received time corresponding to each of the combined data.

The control unit 40a defines the message sending order as an ascending order of the message received time (step S53). The control unit 40a makes the connection port 430a of the communication control unit 43a send each message in accordance with the message sending order defined at step S53 in order to send messages to the ECUs 1a, 1b through the communication line 2a (step S54), and completes the procedure.

As the distribution apparatuses 4b, 4c also perform the procedure shown in the flowchart of FIG. 11 during the message transmission period, messages are sent from the distribution apparatuses 4a, 4b, 4c to the ECUs 1a, 1b, 1c, 1d, 1e, 1f in a message sending order corresponding to an order in which messages are received. Thus, these configurations can prevent message receiving orders of the ECUs 1a, 1b, 1c, 1d, 1e, 1f from being changed in reverse order. In other words, all the ECUs 1a, 1b, 1c, 1d, 1e, 1f receive the messages in the similar message receiving order.

FIG. 12 is a schematic view showing the message sending order and the message arriving (receiving) order between distribution apparatuses 4a, 4b, 4c and ECUs 1a, 1b, 1e, 1f of the embodiment 3. FIG. 12 is similar to the FIG. 7 of the embodiment 2. In FIG. 12, a message arriving order is illustrated in which the message A and the message E arrive at the ECUs 1b, 1f, while a Y-axis represents time course.

In the embodiment 3, the distribution apparatuses 4a, 4b, 4c send messages to the ECUs 1a, 1b, 1c, 1d, 1e, 1f in a message sending order that is an ascending order of message received time when any one of the distribution apparatuses 4a, 4b, 4c receives a message. In the one example shown in FIG. 12, it is illustrated that the distribution apparatus 4a receives the message A from the ECU 1a at time "ta", that the distribution apparatus 4c receives the message E from the ECU 1e at time "te", and that the time "te" is earlier than the time "ta". Thus, the message E is sent earlier than the message A from the distribution apparatuses 4a, 4b, 4c. In the case that the time "ta" when the distribution apparatus 4a receives the message A from the ECU 1a is earlier than the time "te" when the distribution apparatus 4c receives the message E from the ECU 1e, contrary to the example shown in FIG. 12, the message A is sent from the distribution apparatuses 4a, 4b, 4c to the ECUs 1b, 1f earlier than the message E.

As shown in FIG. 12, both the ECUs 1b, 1f can keep the message sending order of the message A and the message E for receiving the messages, and can receive the message E earlier than the message A.

The embodiment 3 is illustrated to include a plurality of distribution apparatuses 4a, 4b, 4c, for illustration purpose.

However, it should be noted that the present invention is not limited to such configurations. A communication system adapting for car may have one distribution apparatus 4, such as illustrated in the embodiment 1, and the control unit 40 of the distribution apparatus 4 may perform the procedures shown in the flowcharts of FIG. 9 and FIG. 11 in order to send messages in an ascending order of the message received time. Even in such configurations, all the ECUs 1a, 1b, 1c, 1d receive messages in the similar message receiving order.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A communication system comprising:
a plurality of distribution apparatuses, each of which is connected with an Electronic Control Unit (ECU) group including a plurality of ECUs that send and receive data, wherein
each distribution apparatus comprises:
a receiving unit that receives a plurality of data sent from the connected ECU group during a receiving period;
a storage unit that stores the plurality of data received by the receiving unit and a received order of the received plurality of data;
a sending unit that sends data among the plurality of data stored by the storage unit toward an ECU in the ECU group and sends another data among the plurality of data stored by the storage unit toward another ECU in the ECU group during a sending period, based on the received order stored by the storage unit, and
a synchronizing unit that synchronizes the storage unit with a storage unit of another distribution apparatus among the plurality of distribution apparatuses during a synchronizing period, wherein
a cycle including the receiving period, the sending period, and the synchronizing period is repeated.

2. A communication system according to claim 1, wherein the storage unit stores the plurality of data received by the receiving unit in association with the received order in which the plurality of data is received by the receiving unit.

3. A communication system according to claim 1, wherein the plurality of data sent from the ECU group comprises identification information represented by numeric values; and
a data sending order performed by the sending unit is an ascending order of the identification information or a descending order of the identification information.

4. A communication system according to claim 1, wherein each distribution apparatus further comprises a time obtaining unit that obtains received time when the plurality of data sent from the ECU group is received by the receiving unit;
the storage unit stores the plurality of data received by the receiving unit in association with the received time obtained by the time obtaining unit; and
a data sending order performed by the sending unit is an ascending order of the received time.

5. A communication system according to claim 4, wherein the sending unit of each distribution apparatus sends a predetermined data stored by its own storage unit and a received time of the predetermined data toward another distribution apparatus.

6. A communication system comprising:

a plurality of distribution apparatuses, each of which is connected with an Electronic Control Unit (ECU) group including a plurality of ECUs that send and receive data, wherein each distribution apparatus comprises:

a receiving means for receiving a plurality of data sent from the connected ECU group during a receiving period;

a storing means for storing the plurality of data received by the receiving means and a received order of the received plurality of data;

a sending means for sending data among the plurality of data stored by the storing means toward an ECU in the ECU group and sending another data among the plurality of data stored by the storing means toward another ECU in the ECU group during a sending period, based on the received order stored by the storing means, and a synchronizing means that synchronizes the storing means with a storing means of another distribution apparatus among the plurality of distribution apparatuses during a synchronizing period, wherein a cycle including the receiving period, the sending period, and the synchronizing period is repeated.

7. A communication system according to claim 6, wherein the plurality of data received by the receiving means is associated by the storing means with the received order in which the data is received by the receiving means.

8. A communication system according to claim 6, wherein the plurality of data sent from the ECU group comprises identification information represented by numeric values; and a data sending order performed by the sending means is an ascending order of the identification information or a descending order of the identification information.

9. A communication system according to claim 6, wherein each distribution apparatus further comprises a time obtaining means for obtaining received time when the plurality of data sent from the ECU group is received by the receiving means;

the data received by the receiving unit is associated by the storing means with the received time obtained by the time obtaining means; and a data sending order performed by the sending means is an ascending order of the received time.

10. A communication system according to claim 9, wherein a predetermined data stored by the storing means of each distribution apparatus and a received time of the predetermined data are sent to another distribution apparatus by the sending means of each distribution apparatus.

11. A communication method using a communication system having a plurality of distribution apparatuses, each of which is connected with another distribution apparatus and an Electronic Control Unit (ECU) group including a plurality of ECUs that send and receive data, comprising the steps performed by a distribution apparatus among the plurality of distribution apparatuses:

receiving a plurality of data sent from a distribution apparatus' own connected ECU group during a receiving period;

storing the plurality of data sent from the distribution apparatus' own connected ECU group and a received order of the plurality of data;

storing a plurality of data sent from another distribution apparatus among the plurality of distribution apparatuses; and sending stored data among the plurality of stored data in toward an ECU in the distribution apparatus' own connected ECU group during a sending period, based on the stored received order, wherein the communication method further comprises steps performed by another distribution apparatus among the plurality of distribution apparatuses including:

sending another data among the plurality of stored data toward an ECU in its own connected ECU group during the sending period based on the stored received order; and synchronizing the storage unit with a storage unit of the another distribution apparatus among the plurality of distribution apparatuses during a synchronizing period, wherein a cycle including the receiving period, the sending period, and the synchronizing period is repeated.

12. A communication method according to claim 11, further comprising:

storing an order in which the plurality of data was received by the plurality of distribution apparatuses.

* * * * *